United States Patent
Strater et al.

(10) Patent No.: US 7,450,561 B2
(45) Date of Patent: Nov. 11, 2008

(54) METHOD AND APPARATUS FOR RESERVING AND RELEASING BANDWIDTH FOR A PACKET-SWITCHED TELEPHONY CONNECTION ESTABLISHED OVER AN HFC CABLE NETWORK

(75) Inventors: Jay Strater, Jamison, PA (US); Robert C. Stein, Coopersburg, PA (US)

(73) Assignee: General Instrument Corporation, Horsham, PA (US)

( * ) Notice: Subject to any disclaimer, the term of this patent is extended or adjusted under 35 U.S.C. 154(b) by 1822 days.

(21) Appl. No.: 10/074,806

(22) Filed: Feb. 13, 2002

(65) Prior Publication Data

US 2003/0154488 A1     Aug. 14, 2003

(51) Int. Cl.
*H04L 12/66* (2006.01)
*H04J 3/16* (2006.01)
(52) U.S. Cl. .................. 370/352; 370/401; 370/465
(58) Field of Classification Search .......... None
See application file for complete search history.

(56) References Cited

U.S. PATENT DOCUMENTS

| | | | | |
|---|---|---|---|---|
| 5,313,467 | A * | 5/1994 | Varghese et al. | 370/468 |
| 5,448,567 | A * | 9/1995 | Dighe et al. | 370/233 |
| 6,272,127 | B1 | 8/2001 | Golden et al. | |
| 6,404,738 | B1 | 6/2002 | Reininger et al. | |
| 6,636,485 | B1 * | 10/2003 | Fijolek et al. | 370/252 |
| 6,665,293 | B2 * | 12/2003 | Thornton et al. | 370/352 |
| 6,754,221 | B1 * | 6/2004 | Whitcher et al. | 370/401 |
| 6,996,128 | B2 * | 2/2006 | Rabenko et al. | 370/468 |
| 2002/0101860 | A1 * | 8/2002 | Thornton et al. | 370/352 |
| 2004/0107284 | A1 * | 6/2004 | Kopereda et al. | 709/229 |
| 2006/0050689 | A1 * | 3/2006 | Rabenko et al. | 370/356 |

FOREIGN PATENT DOCUMENTS

WO    WO 01/86914 A    11/2001

OTHER PUBLICATIONS

Cable Television Laboratories, Inc.; "PacketCable Dynamic Quality-of-Service Specification", pp. 1-121, 211-225, CableLabs, On Line!; Jan. 16, 2002, XP002321076 Retrieved from Internet.

(Continued)

*Primary Examiner*—Andrew Lee
(74) *Attorney, Agent, or Firm*—Larry T. Cullen

(57) ABSTRACT

A method is provided for allocating bandwidth over a cable network to establish a packet-switched telephony connection between two endpoints. The method begins by authorizing and reserving an allocation of bandwidth at the time of a call origination sufficient to establish a voice-band data connection between the endpoints. Next, only a portion of the allocation of bandwidth is committed. This committed portion, which is sufficient to establish a compressed voice traffic connection between the endpoints, is a subset of the reserved allocation of bandwidth. The reserved but uncommitted portion of the allocation of bandwidth is released so that it is available for another connection if at least one of the endpoints determines that the connection is to support voice traffic and not voice-band data. This bandwidth portion may be released after a prescribed period of time has elapsed since the establishment of a full send/receive connection without the detection of voice-band data.

15 Claims, 4 Drawing Sheets

OTHER PUBLICATIONS

Huitema C et al: An Architecture for Residential Internet Telephony Service; IEEE Network, IEEE Inc. New Your, US, vol. 13, No. 3, May 1999, pp. 50-56, XP000870631; ISSN: 08900-8044.

Cable Television Laboratories, Inc.; "PacketCable Network-Based Call Signaling Protocol Specification", PKT-SP-EC-MGCP-I03-010620 (Aug. 2005).

The Internet Society; SDP: Session Description Protocol; Apr. 1998.

The Internet Society; RTP: A Transport Protocol for Real-Time Applications; Jan. 1996 (obsoleted by RFC3550).

The Internet Society; RTP: A Transport Protocol for Real-Time Applications; Jul. 2003 (RFC 3550).

The Internet Society; RTP: Payload for DTMF Digits, Telephony Tones and Telephony Signals; May 2000 (RFC 2833).

* cited by examiner

METHOD AND APPARATUS FOR RESERVING AND RELEASING BANDWIDTH FOR A PACKET-SWITCHED TELEPHONY CONNECTION ESTABLISHED OVER AN HFC CABLE NETWORK

FIELD OF THE INVENTION

This invention relates generally to the provision of real-time services over a packet network, and more particularly to the provision of Internet telephony to transport voice and data over an HFC network.

BACKGROUND OF THE INVENTION

Today, access to the Internet is available to a wide audience through the public switched telephone network (PSTN). Typically, in this environment, a user accesses the Internet though a full-duplex dial-up connection through a PSTN modem, which may offer data rates as high as 56 thousand bits per second (56 kbps) over the local-loop plant.

However, in order to increase data rates (and therefore improve response time), other data services are either being offered to the public, or are being planned, such as data communications using full-duplex cable television (CATV) modems, which offer a significantly higher data rate over the CATV plant than the above-mentioned PSTN-based modem. Services under consideration by cable operators include packet telephony service, videoconference service, T1/frame relay equivalent service, and many others.

Various standards have been proposed to allow transparent bi-directional transfer of Internet Protocol (IP) traffic between the cable system headend and customer locations over an all-coaxial or hybrid-fiber/coax (HFC) cable network. One such standard, which has been developed by the Cable Television Laboratories, is referred to as Interim Specification DOCSIS 1.1. Among other things, DOCSIS 1.1 specifies a scheme for service flow for real-time services such as packet telephony. Packet telephony may be used to carry voice between telephones located at two endpoints. Alternatively, packet telephony may be used to carry voice-band data between endpoint devices such as facsimile machines or computer modems.

When real-time communication is to be established over a cable network, the network elements initially do not know whether the call will carry voice or voice-band data. While this is generally not a problem when the call is established over a public switched telephone network since sufficient resources are always available, in an HFC cable network bandwidth is shared. A goal of network operation is to limit the bandwidth requirements of any one call to allow more calls/subscribers to be supported. Accordingly, to reduce the bandwidth that is required, compressing codecs often are used with voice traffic. Such compressing codecs are not used with voice-band data because they do not reproduce the data with sufficient accuracy. Because compressing codecs can be used with voice but not voice-band data, the bandwidth required by voice-band data is greater than the bandwidth required by voice traffic. Since it is initially not known whether a connection is to support voice traffic or voice-band data, sufficient bandwidth must be allocated to support voice-band data. If it turns out that the connection is only to be used to support voice traffic, more bandwidth will have been allocated than is required, thus reducing the efficiency of the network.

Accordingly, it would be advantageous to modify the bandwidth allocated to a real-time packet switched connection over a cable network depending on whether the connection is to carry voice traffic or voice-band data. This applies particularly to cable network bandwidth in the upstream direction from the customer location to the headend, as this bandwidth typically is limited compared to the downstream bandwidth.

SUMMARY OF THE INVENTION

In accordance with the present invention, a method is provided for allocating bandwidth over a cable network to establish a packet-switched telephony connection between two endpoints. The method begins by authorizing and reserving an allocation of bandwidth at the time of a call origination sufficient to establish a voice-band data connection between the endpoints. Next, only a portion of the allocated bandwidth is committed. This committed portion, which is sufficient to establish a compressed voice traffic connection between the endpoints, is a subset of the reserved allocation of bandwidth.

In accordance with one aspect of the invention, the reserved but uncommitted portion of the allocation of bandwidth is released so that it is available for another connection if at least one of the endpoints determines that the connection is to support voice traffic and not voice-band data. This bandwidth portion may be released after a prescribed period of time has elapsed since the establishment of a full send/receive connection without the detection of voice-band data.

In accordance with another aspect of the invention, the reserved but uncommitted bandwidth may be committed without any further authorization if at least one of the endpoints determines that the connection is to support voice-band data.

In accordance with yet another aspect of the invention, a low-rate codec is initially employed for the compressed voice traffic connection. A high-rate codec may be subsequently employed for the voice-band data.

DETAILED DESCRIPTION

Figure 1:
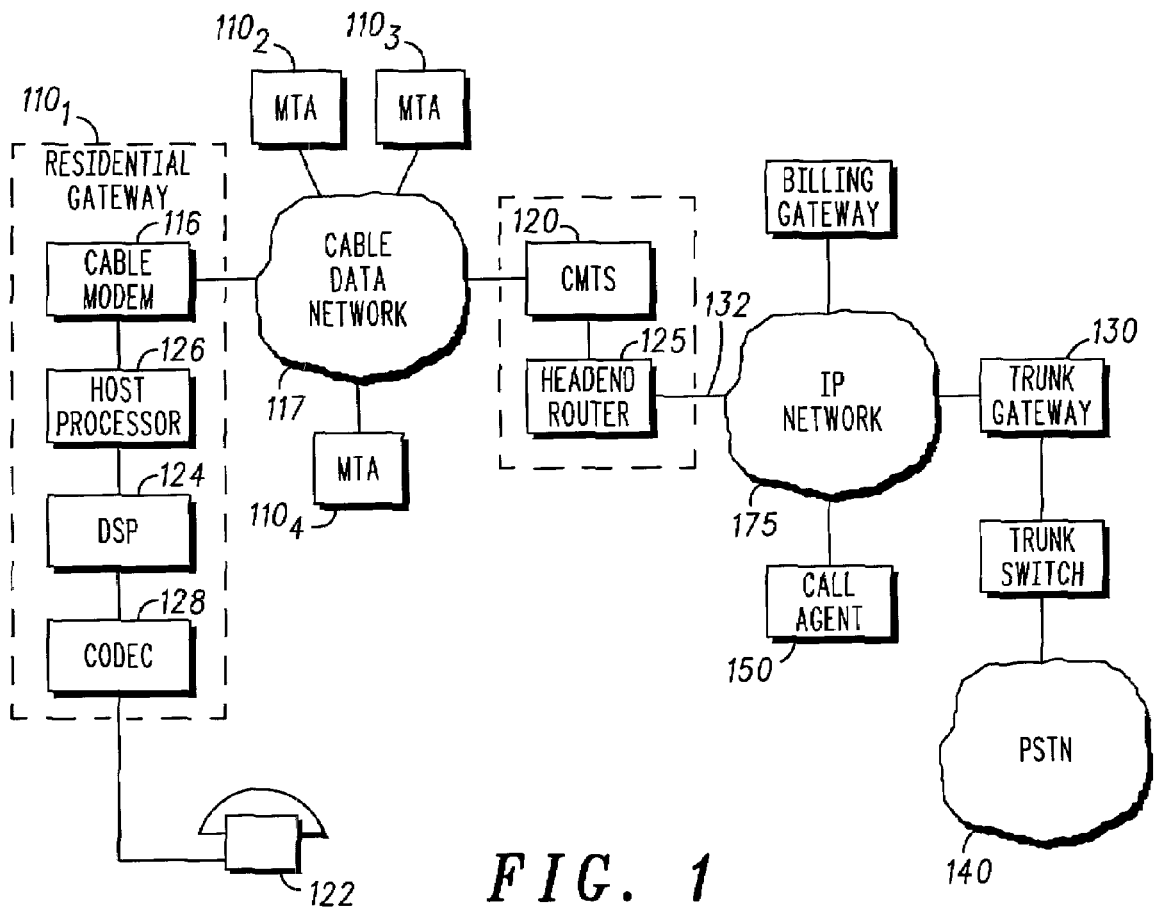
FIG. 1 shows an illustrative full voice-over-Internet communications system embodying the principles of the invention.

An illustrative communications system embodying the principles of the invention is shown in FIG. 1. Other than the inventive concept, the elements shown in FIG. 1 are well known and will not be described in detail.

As noted above, communications system 100 is representative of a network architecture in which subscribers associated with subscriber gateways or Media Telephone Adapters (MTAs) 110$_1$-110$_4$ may access the Internet 175 and a Public Switched Telephone Network (PSTN) 140. In particular, MTAs 110$_1$-110$_4$ are in communication with the Internet 175 via a CATV network. Cable TV network access is provided by an MSO (Multi-Service Operator) (not shown). In this context, it is assumed the MSO provides (besides the traditional CATV access network facilities exemplified by communications network 117) CATV head-end 170 and cable modem 115. This CATV network arrangement is also referred to herein as a cable data network. CATV network is typically an all-coaxial or a hybrid-fiber/coax (HFC) cable network. MTAs $110_1$-$110_4$ is also in communication with PSTN 140 via the cable network, IP network 175, and trunk gateway 130.

As shown in FIG. 1 for MTA 1101, the MTAs $110_1$-$110_4$ include customer premises equipment 122, e.g., a telephone, a codec 128, a Digital Signal Processor (DSP) 124, host processor 126 and Cable Modem (CM) 115. Telephone 122, codec 128, DSP 124, and host processor 126 are collectively representative of data terminal equipment, which is coupled to communications link 117 via CM 115. CM 115 provides the access interface to the cable data network via an RF connector and a tuner/amplifier (not shown). Broadly speaking, DSP 124 generates data packets from the analog signals received from the telephone 122. That is, DSP 124 and codec 128 collectively perform all of the voice band processing functions necessary for delivering voice and voice-band data over a cable network, including echo cancellation, packet loss concealment, call progress tone generation, DTMF/pulse and fax tone detection, audio compression and decompression algorithms such as G.723 and G.729, packet dejittering, and IP packetization/depacketization. Typically, DSP 124 encodes the data with pulse code modulated samples digitized at rates of 8, 16 or 64 kHz. Host processor 126 receives the data packet from the DSP 124 and adds an appropriate header, such as required by the MAC, IP, and UDP layers. Once the packet is complete, it is sent to CM 115, where it remains in a queue until it is transmitted over the cable data network to the CMTS 120 in the CATV headend 170. For the purposes of the present invention, the service being provided is assumed to be a real-time service such as packet telephony. Accordingly, the data packets should be formatted in accordance with a suitable protocol such as the Real-Time Transport Protocol (RTP).

An Internet Service Provider (ISP) provides Internet access. In the context of FIG. 1, it is assumed an ISP provides IP network 175, which includes a cable data network access router (not shown) attached to communications link 132. It should be noted that for illustrative purposes only it is assumed that the above-mentioned MSO and ISP Service provider are different entities even though this is not relevant to the inventive concept.

CM 115 is coupled to CATV head-end 170 via cable network 117, which is, e.g., a CATV radio-frequency (RF) coax drop cable and associated facilities. CATV head-end 170 provides services to a plurality of downstream users (only one of which is shown) and comprises cable modem data termination system (CMTS) 120 and head-end router 125. (CMTS 120 may be coupled to head-end router 125 via an Ethernet 100BaseX connection (not shown).) CMTS 120 terminates the CATV RF link with CM 115 and implements data link protocols in support of the residential service that is provided. Given the broadcast characteristics of the RF link, multiple residential customers and, hence, potentially many home-based LANs may be serviced from the same CMTS interface. (Also, although not shown, it is assumed that the CATV network includes a plurality of CMTS/head-end router pairs.)

CM 115 and CMTS 120 operate as forwarding agents and also as end-systems (hosts). Their principal function is to transmit Internet Protocol (IP) packets transparently between the CATV headend and the customer location. Interim Specification DOCSIS 1.1 has been prepared by the Cable Television Laboratories as a series of protocols to implement this functionality.

In a full voice-over-Internet communication system, a Call Agent 150 is the hardware or software component that provides the telephony intelligence in the communications system and is responsible for telephone call processing. In particular, Call Agent 150 is responsible for creating the connections and maintaining endpoint states required to allow subscribers to place and receive telephone calls, to use features such as call waiting, call forwarding and the like. In theory this invention can also apply to a switched IP communication system in which an IP digital terminal connected to a CLASS5 telephony switch substitutes for the Call Agent and trunk gateway. In this system, IP-based call signaling is conducted between MTA and IPDT and GR303 or V5.2 call signaling is conducted between IPDT and telephony switch. In this system IP voice traffic voice traffic is conducted between MTA and IPDT.

As previously mentioned, voice traffic is typically compressed using a compressing codec such as ITU-T Recommendation G.728 to reduce the amount of data transported through the cable network. While compression reduces voice quality, it also conserves bandwidth, which can be a scarce resource in a shared packet-switched network such as a cable network. Voice-band data, however, cannot be compressed because the fax and modem tones suffer too much distortion, particularly when using legacy analog fax and modem equipment. As a result, high-rate, non-compressing codecs such as ITU-T Recommendation G.711 must be used to transport voice-band data signals with sufficient fidelity. The non-compressed voice-data requires more bandwidth than the compressed voice traffic.

In a packet-switched network providing real-time service in accordance with the DOCSIS standard, bandwidth must be authorized by the Call Agent, after which it can be reserved and committed by cooperation between the CMTS and the MTA. Since the Call Agent cannot, a priori, know that a given call may be a voice-band data call, the Call Agent assumes that the call will be a voice call and only authorizes sufficient bandwidth to support such a call. At the same time the Call Agent uses a signaling protocol such as Network-Based Call Signaling (NCS) to request the call endpoints to negotiate a compressing codec. The endpoints exchange codec capabilities through the Session Description Protocol (SDP) that is incorporated into the NCS signaling protocol. This procedure minimizes the bandwidth that is used and allows the network to accommodate a maximum number of simultaneous calls, subject to traffic engineering design limitations.

The endpoints involved in the call may be MTAs or an MTA and a media gateway such as a trunk gateway or an IP digital termination device, which connects the cable network to the PSTN. Assuming that both endpoints can support a compressing codec, the Call Agent instructs the endpoints to reserve sufficient bandwidth that might be needed if the call supports voice-band data, but only commits the bandwidth on the cable network upstream that is needed to transport RTP packets carrying compressed digitized voice traffic (downstream bandwidth is typically pre-committed). The endpoints perform these bandwidth operations through DOCSIS physical layer management messages that are exchanged with the CMTS.

The Call Agent in effect configures the endpoints to activate the additional bandwidth upon detection of a fax or modem tone without any further intervention from the Call Agent. This is advantageous because if the Call Agent had to intervene upon detection of voice-band data, the additional signaling delay that would be incurred might be sufficient to prevent the endpoints from establishing a successful connection. By reserving the additional bandwidth the call endpoints can switch from a compressing codec to a non-compressing codec without preventing a successful connection from being established between the voice-band data devices. While the additional bandwidth that is reserved for voice-band data cannot be used for other voice calls, it can be used for traffic that has been given best effort prioritization.

To avoid unnecessarily limiting the capacity of the cable network to simultaneously transport multiple voice calls, the MTA attempts to discriminate between a voice-band data call and a voice call so that if a voice call is being transported, the MTA reduces its bandwidth reservation. The MTA can distinguish between voice traffic and voice-band data by recognizing the typical behavior of voice-band data devices such as facsimile machines and modems, which usually manifests itself within two seconds of establishing the connection. If the MTA does not detect voice-band data from the subscriber's data devices (or has not been notified via various signaling means that voice-band data is to be transported) the call is assumed to be a voice call and the MTA reduces its bandwidth reservation accordingly. This procedure is conducted via a DOCSIS Dynamic Service Change request with Quality of Service (QOS) admission and activation of the lower bandwidth requirement.

CALL SEQUENCE EXAMPLE

The following example sets forth an exemplary sequence of steps by which a voice-band data connection is established in accordance with the present invention. While this example employs particular standards and protocols, those of ordinary skill in the art will recognize that the present invention is not limited to these protocols but rather encompasses any appropriate set of protocols. For purposes of this example the important messages are exchanged between the Call Agent and the MTAs, the Call Agent and the CMTS, and the MTAs and the CMTS.

Messages between the Call Agent and the MTAs involve call signaling control and are exchanged using the PacketCable™ Network-Based Call Signaling (NCS) protocol. Other protocols that may be employed to exchange messages between the Call Agent and the MTAs include without limitation the Media Gateway Control Protocol (MGCP).

Messages between the Call Agent and the CMTS involve call resource signaling control using the PacketCable™ Dynamic Quality of Service (DQOS) protocol. The resource control applies to DOCSIS upstream and downstream service flows but is essential in mitigating theft or denial of service attacks of upstream Unsolicited Grant Service (UGS). UGS is needed to ensure voice and voice-band call quality Messages between the MTAs and the CMTS involve call resource signaling requests and responses using DOCSIS and the NCS protocol. NCS commands contain DQOS resource reservation requests that the MTA responds to by issuing DOCSIS Dynamic Service Add and Change Messages with appropriate UGS Quality of Service Requests.

Call Origination

Figure 2A:
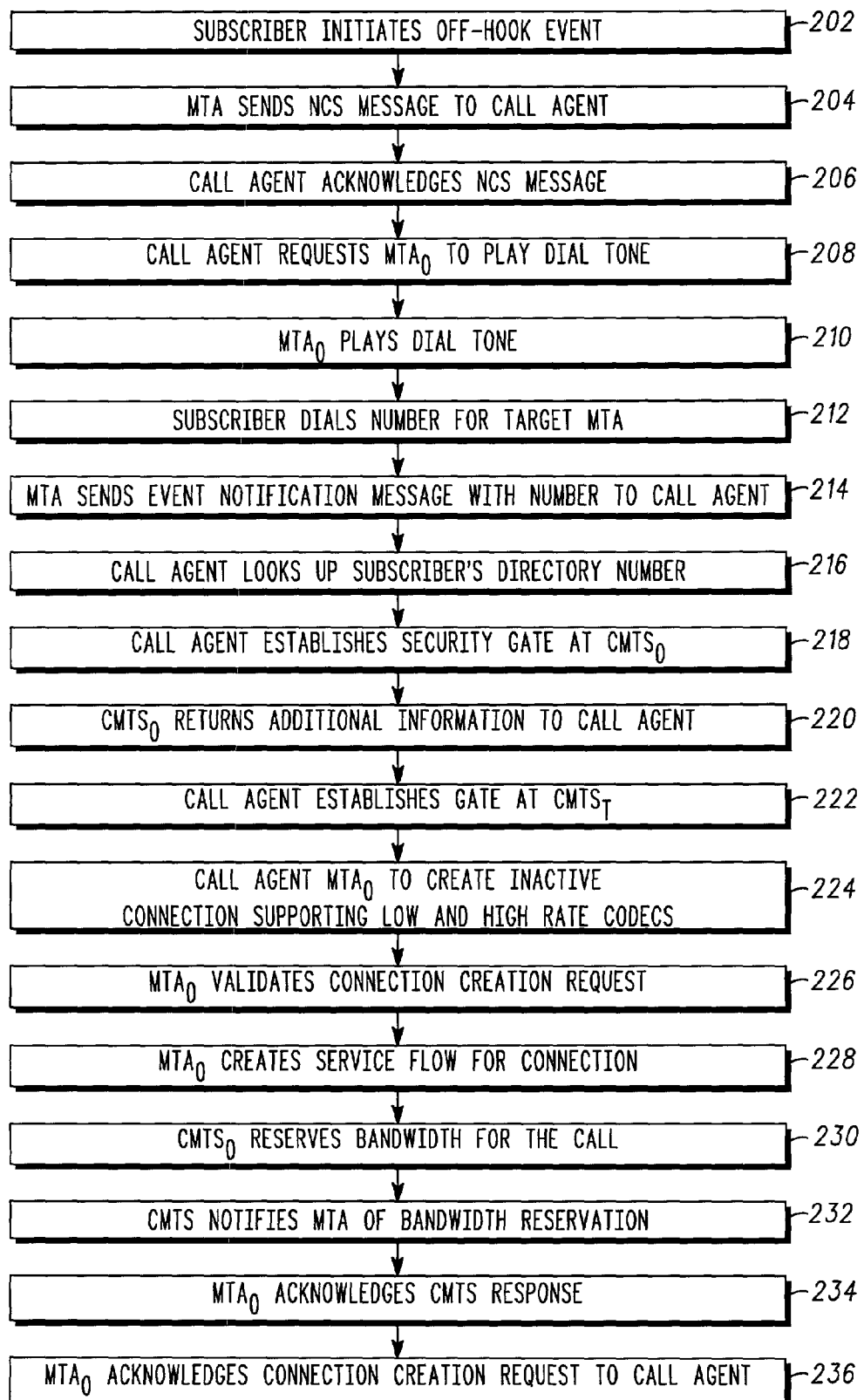
FIGS. 2A-2B is a flow chart illustrating an example of the call origination process.
Figure 2B:
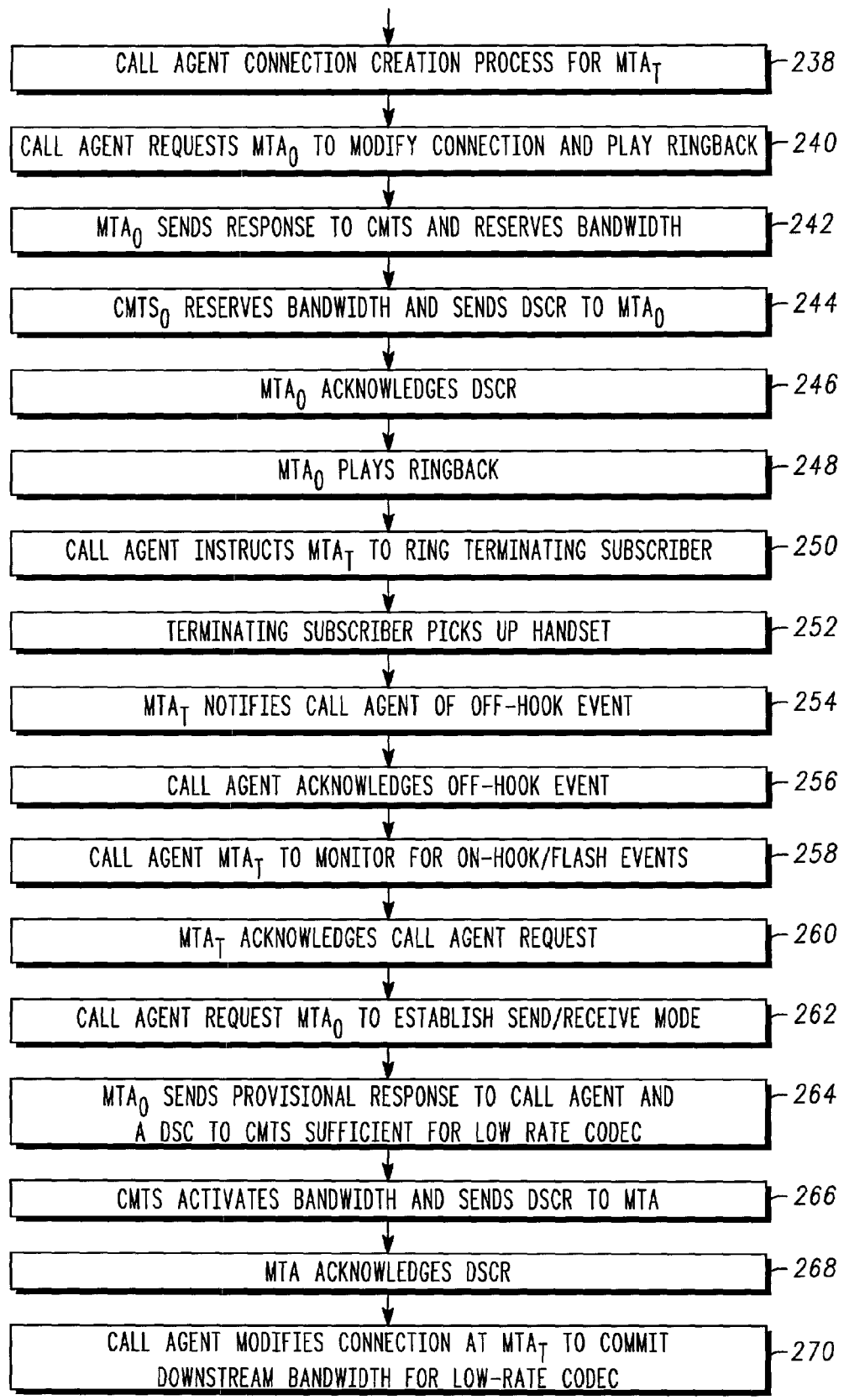

This first sequence of steps establishes the connection between MTAs in the cable network. Referring to FIGS. 2A-2B, prior to the beginning of the sequence, the Call Agent requests the originating and terminating MTAs to monitor their respective subscriber lines for off-hook events. The sequence begins when an originating subscriber picks up a handset connected to an access line served by the originating MTA, which is denoted $MTA_o$ (step 202). $MTA_o$ detects the off-hook transition and sends an NCS event notification message to the Call Agent (step 204), which is acknowledged by the Call Agent (step 206). The Call Agent then requests the $MTA_o$ to play a dial tone and to monitor for dialed digits, and also requests the $MTA_o$ to monitor for an on-hook event, should the subscriber decide to disconnect (step 208). The $MTA_o$ acknowledges the signal request from the Call Agent and plays a dial tone to the originating subscriber (step 210). The originating subscriber dials the directory number for the target MTA's subscriber access line (step 212) and the $MTA_o$ collects the dialed digits and sends an event notification message containing the digits to the Call Agent (step 214). The Call Agent acknowledges the digits event notification message and looks up the subscriber's directory number (step 216). It should be noted that although resolving the termination of the call may be considerably more complicated than in this example, for purposes of this discussion assume that the Call Agent determines the termination to be another MTA (denoted $MTA_t$) connected to the cable network.

The Call Agent next establishes a security "gate" at the CMTS serving the $MTA_o$, which is denoted the $CMTS_o$ (step 218). The gate authorizes sufficient downstream and upstream bandwidth to support a high rate codec that can be used to support a voice-band data connection. The CMTS acknowledges the gate set request and returns information (e.g., a gate ID) to the Call Agent, which in turn must be passed to the $MTA_o$ (step 220). Likewise, the Call Agent also establishes a complementary gate at the CMTS serving the MTAt, which is denoted $CMTS_t$ (step 222).

The Call Agent requests $MTA_o$ to create an inactive connection, which includes support for a low-rate codec and a high-rate codec (step 224). In this example, the low-rate codec is G.728 and the high-rate codec is G.711. Of course, other codecs may be employed and can be negotiated in accordance with the signaling protocol. The request includes the gate ID for the $CMTS_o$ that is allocated for this call. Because the connection is created in an inactive mode, the MTA will reserve but not commit the bandwidth at this time. The $MTA_o$ validates the connection creation request and sends a provisional response to the Call Agent. (step 226). It should be noted that some Call Agents may wait until a remote connection descriptor from the terminating MTAt is received before passing any remote connection descriptor to the originating MTAo. When this occurs, resource reservation is not done at this point in the call setup sequence.

$MTA_o$ creates a service flow for the connection with the CMTS using a DOCSIS Dynamic Service Addition Request (step 228). This service flow includes a resource reservation for sufficient bandwidth, both upstream and downstream, to support the high-rate codec, which in this case is G.711. No bandwidth is committed at this time. The request includes the gate ID that the $MTA_o$ received from the Call Agent.

The $CMTS_o$ uses the gate ID to locate the gate for the call and checks that the requested bandwidth is within the bandwidth authorized by the Call Agent and then reserves the bandwidth for the call (step 230). This bandwidth may be used for other best-effort traffic on the network, but may not be allocated to any other telephone call for the duration of this call, or until modified by a request from the MTA. The CMTS notifies the MTA that the bandwidth has been reserved with a Dynamic Service Addition Response (step 232). $MTA_o$ acknowledges the CMTS response with a Dynamic Service Addition Acknowledgement (step 234).

$MTA_o$ acknowledges the connection creation request to the Call Agent (step 236). The acknowledgement includes a Session Description Protocol (SDP) specification for the codecs that the MTA is prepared to receive on this connection. This is the $MTA_o$'s "local connection descriptor" and will be passed by the Call Agent to the MTAt. This descriptor indicates that the $MTA_o$ is capable of receiving audio packets for the high-rate and the low-rate vocoders during this call. The Call Agent then repeats the connection creation process with the MTAt (step 238). Because the $MTA_o$ has provided its local connection descriptor, the Call Agent can pass this to the $MTA_t$ in the connection creation request.

At this point, the Call Agent knows that the bandwidth for the call has been reserved successfully for both $MTA_o$ and $MTA_t$. The Call Agent requests the $MTA_o$ to modify its connection, and to play ringback toward the originating subscriber (step 240). The connection modification command includes the remote connection descriptor (SDP) supplied by the terminating MTA in its connection creation acknowledgement. The $MTA_o$ sends a provisional response and reserves bandwidth needed for the call based on this remote connection descriptor using Dynamic Service Change Request to the CMTS (step 242). $CMTS_o$ reserves the bandwidth and sends a Dynamic Service Change Response to the $MTA_o$ (step 244), which response the $MTA_o$ acknowledges (step 246). The $MTA_o$ acknowledges the connection modification to the Call Agent and begins playing a ringback tone toward the originating subscriber (step 248).

The Call Agent now instructs the $MTA_t$ to begin alerting the terminating subscriber by ringing the handsets connected to the MTAt (step 250). At this point, the originating subscriber is hearing ringback and the terminating subscriber's phone is ringing. The terminating subscriber answers the phone by picking up a handset (step 252). This action also might be taken by a voice-band data device such as a facsimile machine or a data modem. The $MTA_t$ notifies the Call Agent of the off-hook event (step 254), which is acknowledged by the Call Agent (step 256). The Call Agent requests the $MTA_t$ to begin monitoring for on-hook or hook flash events (step 258), and the $MTA_t$ acknowledges the request (step 260). The Call Agent also requests the $MTA_o$ to modify its connection to full send/receive mode (step 262), which also cancels the request for ringback. The $MTA_o$ sends a provisional response to the Call Agent and a Dynamic Service Change to the CMTS to commit the upstream bandwidth, which is sufficient for the low-rate codec (step 264). This allows the $MTA_o$ to begin sending audio using the low-rate codec, although additional bandwidth remains reserved for the high-rate codec.

The CMTS activates the bandwidth and sends a Dynamic Service Change Response to the MTA (step 266) and the MTA acknowledges the response (step 268). The MTA acknowledges the connection modification to the Call Agent and the Call Agent modifies the connection at the $MTA_t$ to full send/receive mode, thus committing the downstream bandwidth for the low-rate codec on this connection as well (step 270).

At this point a full send/receive connection has been established. If this is a voice call, the parties can now converse. Bandwidth has been committed for the low-rate codec, but a larger amount of bandwidth has been reserved for the call. If the call does prove to be a voice call, the additional reserved bandwidth is released. If the call should prove to be voice-band data call, the additional bandwidth is activated. The release and activation of the additional bandwidth is described below.

Release of Bandwidth

Figure 3:
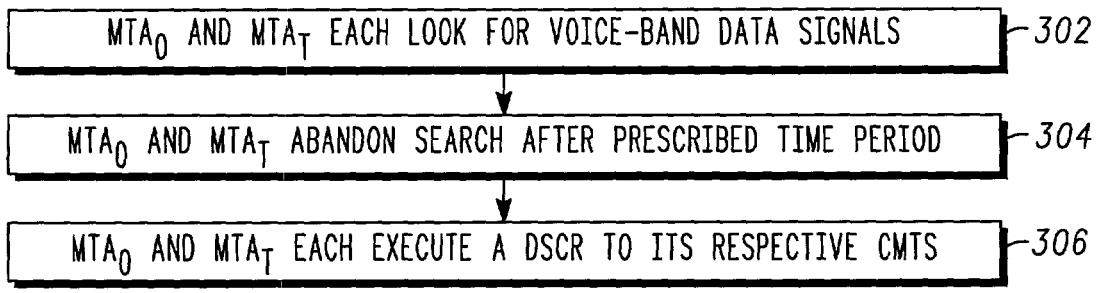
FIG. 3 is a flow chart illustrating an example of the process by which bandwidth is released.

This section describes the sequence of steps used by the MTAs to release bandwidth back to the cable network. Referring to FIG. 3, the process begins when $MTA_o$ and $MTA_t$ independently look for voice-band data signals such as fax tones or modem tones, as defined in PacketCable™ NCS specification I04 and later (step 302). The MTAs independently abandon the search for voice-band data signals after a configurable time period (step 304). For example, a two second search period may be used because this would more than span the time required to detect a modem or fax answer tone with or without phase reversal. Each MTA then executes a Dynamic Service Change Request to its respective CMTS to reduce the bandwidth reservation to match the bandwidth already committed to the transport of the voice call using the negotiated low-rate codec (step 306). This releases the unused reserved bandwidth and makes it available for other telephone calls. The Dynamic Service Change Request contains a smaller UGS grant size but an unchanged grant interval. The grant size matches the size of the low rate vocoder payload size at the current grant interval plus overhead for DOCSIS, Ethernet, IP, UDP and TCP headers.

As a result of this process, the voice call continues with only the bandwidth required to support the low-rate codec. It should be noted that some legacy equipment and even some PC-based facsimile software may allow the user to initiate voice-band data transmission at some time after a voice call has been initiated. This situation will be addressed below.

Voice-Band Data Detection After Initiation Of Call

As previously noted, it is possible for voice-band data, typically facsimile transmissions, to be manually initiated at some time after a call has been established, possibly even after a voice conversation has been conducted. Since a voice call has been established using a low-rate codec, the extra bandwidth reserved for a possible voice-band data call was released in the manner described above. While the following example assumes that the caller served by the $MTA_o$ starts a fax transmission manually, the discussion is equally applicable when the caller served by the $MTA_t$ initiates the fax transmission.

Figure 4:
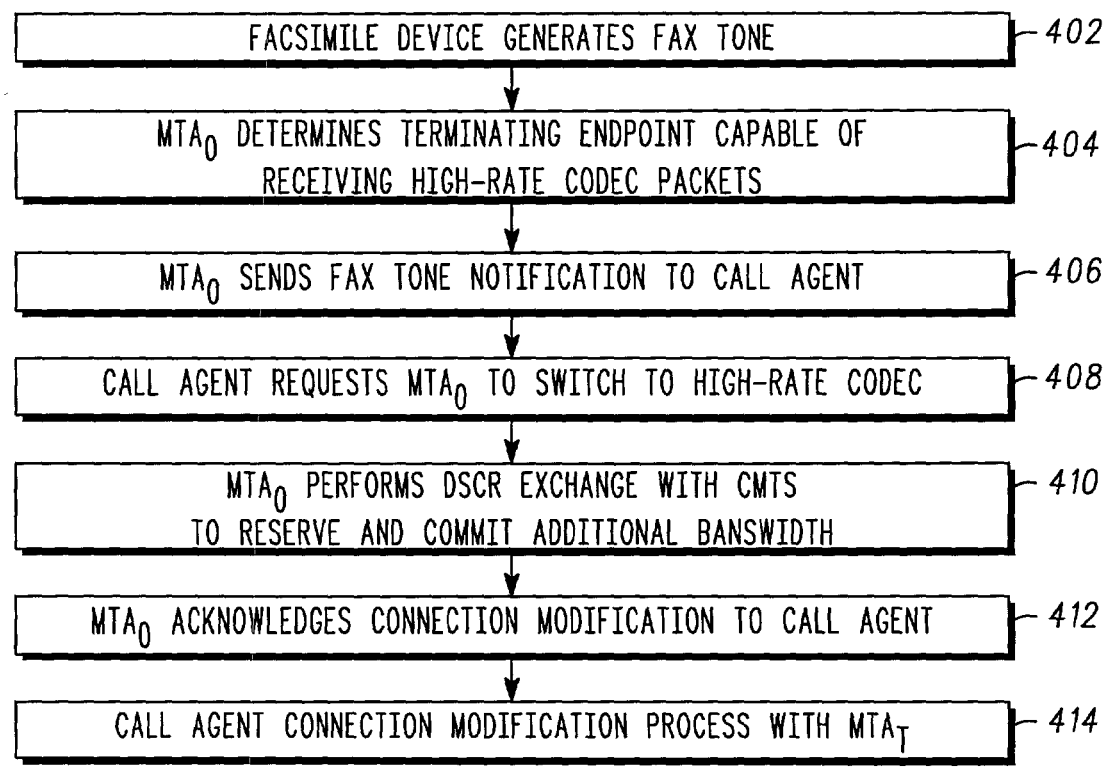
FIG. 4 is a flow chart illustrating the process of receiving voice-band data after the initiation of a call.

Referring to FIG. 4, the process begins when the facsimile device generates a fax calling tone, as defined by ITU-T Recommendation T.30 (step 402). The $MTA_o$ detects the fax calling tone and consults its remote connection descriptor and determines that the terminating endpoint is able to receive high-rate codec packets (step 404). Since sufficient bandwidth is not available, the MTA cannot switch codecs as above, and instead sends a fax tone notification to the Call Agent. (step 406). The Call Agent acknowledges the fax tone event notification and responds by requesting the $MTA_o$ to switch to a high-rate codec capable of supporting the fax transmission (step 408). This differs from the original call setup because the Call Agent does not give the $MTA_o$ a list of codecs from which to negotiate, but rather stipulates just one codec. The $MTA_o$ then sends a provisional response and performs a Dynamic Service Change Request exchange with its CMTS to both reserve and commit the additional bandwidth needed for the fax connection (step 410). This step is not guaranteed to succeed and the fax transmission may fail. When a failure occurs the voice-band data device generally reports this to the user. Since this is an attended operation the user can retry at a later time.

Assuming that the new bandwidth has been successfully allocated, the $MTA_o$ acknowledges the connection modification to the Call Agent (step 412). The Call Agent then repeats the connection modification process with the $MTA_t$ (step 414).

It should be noted that this is just one scenario that may arise when voice-band data transmission is initiated after the call has begun. For example, some facsimile devices do not send CNG. In this case, when the voice-band data operation is initiated, the first signal seen by the cable network may be an answer tone issued by the terminating device. When this occurs the answer tone is detected by the $MTA_f$, which signals "ft" to the Call Agent. The Call Agent then modifies the connection as described above. While not required, the Call Agent may start by modifying the connection at the endpoint that sent the event notification. Depending upon the particular Call Agent implementation, the Call Agent could attempt to modify both connections in parallel.

Although various embodiments are specifically illustrated and described herein, it will be appreciated that modifications and variations of the invention are covered by the above teachings and are within the purview of the appended claims without departing from the spirit and intended scope of the invention. For example, while the invention has been described in terms of packet telephony service, one of ordinary skill in the art will recognize that the invention is equally applicable to the provision of other real-time services such as video conferencing, for example.

The invention claimed is:

1. A method of allocating bandwidth over a cable network for a packet-switched telephony connection between two endpoints, said method comprising the steps of:

authorizing and reserving an allocation of bandwidth at the time of a call origination sufficient to establish a voice-band data connection between the endpoints; and committing only a portion of the allocation of bandwidth sufficient to establish a compressed voice traffic connection between the endpoints, wherein the committed portion of the allocation is a subset of the reserved allocation of bandwidth, wherein the reserved but uncommitted portion of the allocation of bandwidth is released from the reserved allocation of bandwidth for the connection based on a determination that a voice-band data traffic is not present in the connection.

2. The method of claim 1, wherein the reserved but uncommitted portion of the allocation of bandwidth is released and made available for another connection if at least one of the endpoints determines that the connection is to support voice traffic and not voice-band data.

3. The method of claim 2 wherein the releasing step is performed after a prescribed period of time has elapsed since establishment of a full send/receive connection without detection of voice-band data.

4. The method of claim 3 wherein said prescribed period of time is sufficient to detect voice-band data.

5. The method of claim 1 further comprising the step of committing the reserved but uncommitted bandwidth without any further authorization if at least one of the endpoints determines that the connection is to support voice-band data.

6. The method of claim 1 further comprising the steps of: negotiating between the endpoints support for a high-rate codec and a low-rate codec; and, initially employing the low-rate codec for the compressed voice traffic connection.

7. The method of claim 5 further comprising the steps of: negotiating between the endpoints support for a high-rate codec and a low-rate codec; and, initially employing the low-rate codec for the compressed voice traffic connection.

8. The method of claim 7 further comprising the step of employing the high-rate codec for the voice-band data.

9. The method of claim 2 further comprising the step of committing the reserved but uncommitted bandwidth by notifying a Call Agent associated with the cable network if voice-band data is detected after performing the step of releasing the additional bandwidth.

10. The method of claim 9 further comprising the step of stipulating to the endpoints a particular high-rate codec for the voice-band data.

11. The method of claim 1 wherein the authorizing step is performed by a Call Agent associated with the cable network.

12. The method of claim 1 wherein at least one of the endpoints is an MTA.

13. The method of claim 1 wherein the cable network is an HFC cable network.

14. The method of claim 1 wherein the reserved but uncommitted portion of the bandwidth can be used for traffic assigned best-effort prioritization.

15. The method of claim 5 wherein a determination that the connection is to support voice-band data is made by detecting a tone from a voice-band data device.

* * * * *

UNITED STATES PATENT AND TRADEMARK OFFICE
CERTIFICATE OF CORRECTION

PATENT NO.         : 7,450,561 B2
APPLICATION NO.    : 10/074806
DATED              : November 11, 2008
INVENTOR(S)        : Strater et al.

It is certified that error appears in the above-identified patent and that said Letters Patent is hereby corrected as shown below:

FIGURE 4, Sheet 4 of 4, for Tag "410", Line 2, please delete "BANSWIDTH" and replace with --BANDWIDTH--

COLUMN 3:
Line 5: Please delete "1101," and replace with --$110_1$,--

COLUMN 6:
Line 25: Please delete "MTAt," and replace with --$MTA_t$,--
Line 38: Please delete "MTAt" and replace with --$MTA_t$--
Line 40: Please delete "MTAo." and replace with --$MTA_o$.--
Line 65: Please delete "MTAt." and replace with --$MTA_t$.--

COLUMN 7:
Line 1: Please delete "MTAt" and replace with --$MTA_t$--
Line 23: Please delete "MTAt" and replace with --$MTA_t$--

COLUMN 8:
Line 43: Please delete "Agent." and replace with --Agent--

Signed and Sealed this

Twenty-fifth Day of August, 2009

David J. Kappos
*Director of the United States Patent and Trademark Office*